US005911035A

United States Patent [19]
Tsao

[11] Patent Number: 5,911,035
[45] Date of Patent: Jun. 8, 1999

[54] METHOD AND APPARATUS FOR DETERMINING BINOCULAR AFFINE DISPARITY AND AFFINE INVARIANT DISTANCE BETWEEN TWO IMAGE PATTERNS

[76] Inventor: Thomas Tsao, 12405 Venice Pl., Silver Spring, Md. 20904

[21] Appl. No.: 08/420,762

[22] Filed: Apr. 12, 1995

[51] Int. Cl.⁶ .................................................. G06F 15/18
[52] U.S. Cl. .............................. 395/21; 395/21; 395/22; 395/24; 382/107
[58] Field of Search .................................. 395/21, 22, 24

[56] References Cited

U.S. PATENT DOCUMENTS

| | | | |
|---|---|---|---|
| 3,783,294 | 1/1974 | Koper | 250/558 |
| 4,723,159 | 2/1988 | Imsand | 358/88 |
| 4,796,997 | 1/1989 | Svetkoff | 356/376 |
| 4,941,193 | 7/1990 | Barnsley | 382/56 |
| 4,965,840 | 10/1990 | Subbarao | 382/1 |
| 5,005,147 | 4/1991 | Krishen | 364/578 |
| 5,442,716 | 8/1995 | Otsu | 382/181 |
| 5,475,803 | 12/1995 | Stearns | 395/136 |
| 5,535,302 | 7/1996 | Tsao | 395/22 |

OTHER PUBLICATIONS

Grossberg, "Stereo boundary fusion by cortical complex cells: A system of maps, filters, and feedback networks for multiplexing distributed data," Neural networks, v2 n1 pp. 29–51, Dec. 1989.

Fleet, "Neural encoding of binocular disparity: Energy models, position shifts and phase shifts," Vision research v36 n12 pp. 1839–1857, Jun. 1996.

Frye, "Derivative of gaussian functions as receptive field models for disparity sensitive neurons of the visual cortex," IEEE 1996 15th southern conf on biomed. engin., Dec. 1996.

Ulug, "A signal processing neural network resembling the simple cells of the visual cortex," IEEE 1992 RNNS symposium on neuroinformatics and neurocomputers, Dec. 1992.

Kropotov, "Segmentron: a neuronal network simulating the structure and the function of the visual cortex," Neuroinformatics and neurocomputers, 1992 RNNS/IEEE symposium, Dec. 1992.

Anton, "A neural network for perceptual grouping, based on the architecture of the primary visual cortex, efficient for texture segregation in complex natural images," 1993 IEE Intl conf on neural networks, Dec. 1993.

Kopecz, "A cortical structure for real world image processing," 1993 IEEE Intl conf on neural networks, Dec. 1993.

Qiu, "Modelling the visual cortex using artificial neural networks for visual image reconstruction," 1995 IEE conf pub 409 on artificial neural networks, Dec. 1995.

(List continued on next page.)

*Primary Examiner*—Robert W. Downs
*Assistant Examiner*—Jeffrey S Smith

[57] ABSTRACT

A method and apparatus is provided to determine affine disparity and affine invariant pattern distance from two image patterns. The method formulates the problem of determining affine disparity and affine invariant distances between two image patterns as one of finding an affine transform for an adjustable hypercolumn (HC) reference frame that maximally compensates the affine difference of the two image patterns. The image HC-coding and the difference vector is computed from two image patterns using specific orientation (SO) simple cell receptive fields employed in an HC-reference system. The Lie derivative of the difference vector is computed from image patterns using Lie germs. In accordance with one aspect of the invention, the affine transform that maximally compensates the affine difference between two image patterns is found by a gradient system wherein the gradient is calculated from the difference vector and its Lie derivatives. A closed loop adaptive HC-reference frame network is provided to extract binocular affine disparity using an energy minimization technique in a manner which permits for coincidental binocular fusion of the images in the HC-coding and determination of affine invariant pattern distance in general.

20 Claims, 8 Drawing Sheets

OTHER PUBLICATIONS

Qian, "Computing stereo disparity and motion with known binocular cell properties," Neural computation, 6, 390–404, Dec. 1994.

Mori, "Mechanisms of stereopsis based on binocular disparity and optical flow," Denshi Gijutsu sogo kenkyusho iho, v49 n12 pp. 969–982, Dec. 1995.

Gilinsky, "Neurophysiological basis for fgure and ground," J. Optical Soc. of America, v63 n10 p1311, Dec. 1973.

Busettini, "A role for sterescopic depth cures in the rapid visual stabilization of the eyes," Nature v380 n6572 p342–5, Mar. 1996.

Peper, "A mechanism for the development of feature detecting neurons," 1995 IEE new zealand int'l two stream conf on Artif. neur. net., Dec. 1995.

METHOD AND APPARATUS FOR DETERMINING BINOCULAR AFFINE DISPARITY AND AFFINE INVARIANT DISTANCE BETWEEN TWO IMAGE PATTERNS

BACKGROUND OF THE INVENTION

1. Field of the Invention

The invention relates generally to a method and apparatus for extracting geometric information from and performing invariant pattern analysis on visual stimuli and; more particularly, to an artificial neural system for determining affine disparity parameters and affine invariant pattern distance from two image patterns. The invention further relates to an image pattern geometric analysis system comprising a plurality of specially constructed geometric computing devices simulating the simple cells in the visual cortex of primates and functioning as a reference frame within the scope of a hypercolumnar (HC) organization of visual cortex for coding intensity image data, a plurality of specially constructed geometric computing devices simulating Lie germ type hypercomplex cells in visual cortex of primates functioning as infinitesimal generators of the two dimensional affine Lie group for computing Lie derivatives of intensity images in the HC-coding, a plurality of specially constructed geometric computing devices simulating intrinsic neurons in visual cortex of primates functioning as affine transformer of the HC-reference frame, and a feedback circuit for determining affine disparity and affine invariant pattern distance from two image patterns.

2. Description of the Related Art

Figure 1:
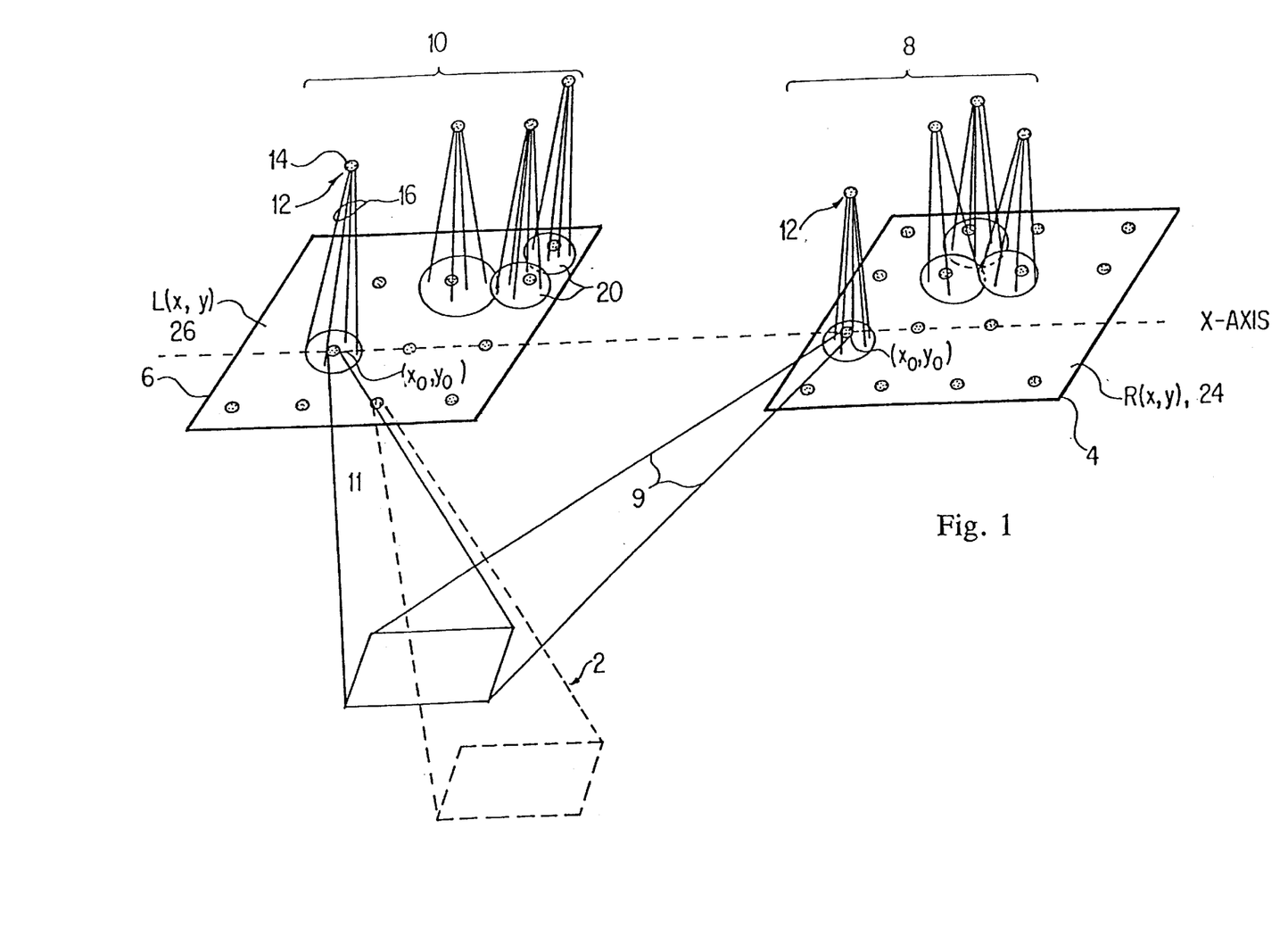
FIG. 1 is a schematic view of binocular images focused on photoreceptor grids associated with the right and left eyes of a vertebrate.

Artificial vision systems are generally modeled after biological vision systems of vertebrates. With reference to FIG. 1, most vertebrates begin the process of generating visual representations by receiving light from a visual scene 2 through lenses in the right and left eyes onto a retina located in their respective orbs (not shown). Each retina comprises a two-dimensional grid of photoreceptors 4 and 6, respectively, for sensing the light and for generating an analog neural potential, which is proportional to the logarithm of the intensity of the light at a corresponding point in the image. The light incident each photoreceptor comes from the receptive field of that photoreceptor, that is, a local region of space in the vicinity of the receptor. The location of a photoreceptor on the retina is useful for encoding the direction of the light source in real space. Multiple, two-dimensional layers of neurons 8 and 10 process and transmit signals corresponding to light source location information through the optic nerve to two-dimensional layers of neurons in the brain in accordance with a conformal, retinotopic mapping, which maintains the relative spatial locations of the signals. Accordingly, receptive fields of adjacent neurons correspond to adjacent regions of the visual field.

Figure 2:
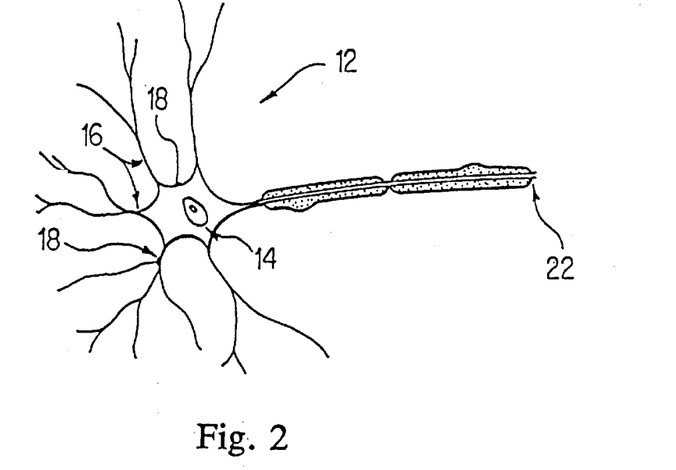
FIG. 2 depicts an exemplary neuron in a vertebrate's brain.
Figure 3:
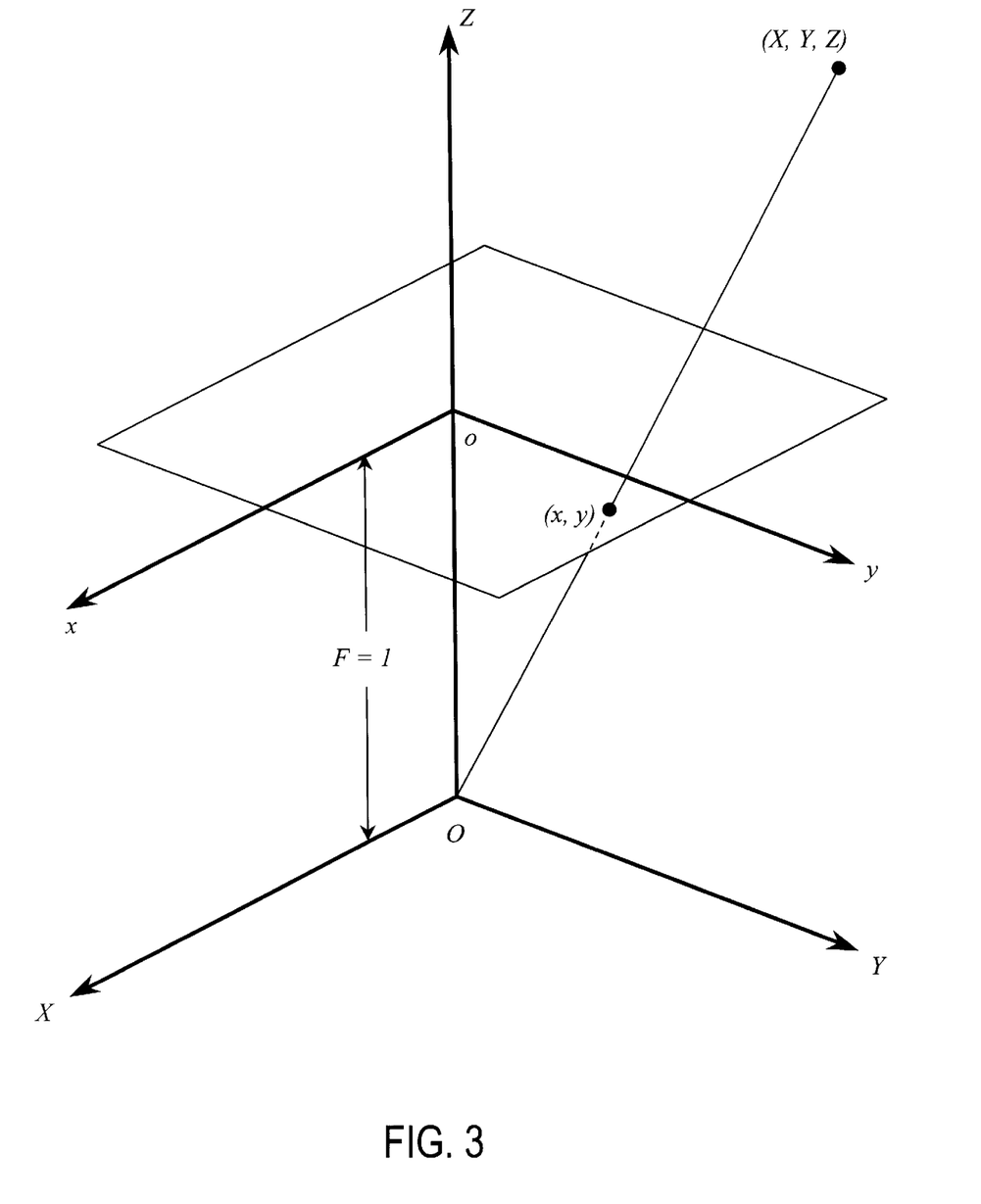
FIG. 3 is a plot of a viewer centered coordinate system; the plane Z=1 is regarded as the image plane, and an oxy coordinate system is taken on it in such a way that the x and y axes are parallel to the X and Y axes, respectively, with origin at (0,0,1). A point X,Y,Z) in the scene is projected onto the intersection of the image plane with the ray connecting the point (X,Y,Z) and the origin O, F, the focal length, is taken to be 1 unit.

With further reference to FIG. 1, the approximate receptive fields of two individual photoreceptor are illustrated by lines 9 and 11. Only a portion of one of the layers of neurons 8 and 10 associated with the respective photoreceptor grids 4 and 6 in the retina is shown for illustrative purposes. As stated previously, the layers 8 and 10 comprise matrix-like arrangements of individual neurons. Several different types of neurons exist. As shown in FIG. 2, a neuron 12 generally comprises a cell body or soma 14 from which one or more dendrites 16 extend. FIG. 1 depicts several neurons 12 with dendrites 16 receiving input signals from a receptive field through ocular Gaussian windows on their corresponding photoreceptor grids. The windows 20 of neurons associated with a neuron layer can overlap. A dendrite 16 can receive data from a receptive field and can process it, as well as supply it to other neurons through synapses 18 located on the dendrites as shown in FIG. 2. The soma 14 determines a weighted linear summation of the intensity of various points within the window 20.

With further reference to FIG. 2, the soma 14 can include an axon 22 which processes data for local transmission and transmits data over long distances. Not all neurons, however, have axons. In operation, synaptic inputs are collected and are integrated on the capacitance of a corresponding soma until a critical threshold is reached, at which time a somewhat digitized nerve pulse is generated and propagated along the axon. Many types of neurons, including those with axons, have synaptic outputs as well as inputs on their dendrites 16. The dendrites, therefore, serve an important function because much of the lateral communications in the nervous system is local and effectuated by local, graded analog potentials on the dendrites 16, rather than by digital nerve pulses generated by the soma 14 and transmitted along the axon 22.

As neural processing of visual information progresses, representations of the light source become more complex. For example, the retina itself performs transformation from simple intensity to more complex representations such as local averages of intensity with Gaussian weight functions, Laplacians of Gaussian (LOG) operations, and time derivatives of intensity. Thus, signals from the photoreceptor are transformed through several layers of neural processing before transmission through the optic nerve to the brain. Finally, the visual center of the brain, i.e., the visual cortex, construct models of three-dimensional space using the spatiotemporal patterns of output signals received from the retina.

The visual cortex of primates and cats has columnar organization. The pyramid cells of a column orthogonal to the cortical layering respond to visual stimulus from a particular small zone of visual area, and with the same preferred orientation. Successive orientation columns are arranged perpendicularly to the succession of ocular dominance (right and left) columns. A vertical cortical hypercolumn is defined to embrace all preferred orientations for signals from the two eyes. It is a local binocular information processing unit for visual stimulus from a small zone in the view field. The linear simple cells within a cortical hypercolumnar structure provide means for cortical representation of visual stimulus from the zone. The receptive field functions of these simple cells collectively provides a reference frame for cortical representation of the visual stimulus from the zone. The neural receptive fields are not rigidly locked to absolute retinal coordinates. Instead, the receptive fields of the cortical cells are able to dynamically shift and warp to compensate for motion and disparity. Many types of intrinsic neurons are involved in dynamically shaping the receptive fields of the cortical principal neurons. A dynamical receptive field theory is discussed in a paper by D. C. Van Essen, and C. H. Anderson entitled "Reference Frames and Dynamic Remapping Processes in Vision" in *Computational Neuroscience*. It is believed that the dynamic aspect of simple cells hold the key to the understanding of dynamical and realtime process of binocular stereo, image motion, and invariant pattern recognition.

Binocular vision systems are useful because the fusion of two stereo images allows for the construction of three-dimensional models of visual scenes and, therefore, shape and depth perception. The binocular images perceived by the right and left eyes of most vertebrates, for example, are slightly different views of a three-dimensional scene which is projected onto the right and left retinas, respectively. With further reference to FIG. 1, right and left ocular images 24 and 26 comprise essentially identical intensity values at corresponding pixels. The images, however, are displaced and affine transformed with respect to each other along an x-axis, which corresponds to a line connecting the right and left eyes. The amount that the left and right ocular images of a visual scene are displaced and affine transformed with respect to each other is referred to as binocular affine disparity. Affine disparity maps, i.e., affine disparity values determined at each of an array of points in an image, can be used to calculate the distance between the eyes and an object in the visualized scene and the shape, namely the spatial orientation at each point on the visible surface of the object.

Once affine disparity between right and left ocular images is determined in a biological vision system, binocular images can be fused into a single image which provides three-dimensional, spatial information. The interaction of the left and right ocular views of a scene begin in the striate cortex of a vertebrate's brain. This interaction involves the formulation of binocular data at thin strips of cortex which receive input signals from either the left or right eye. In the primary visual cortex of many primates, these strips or columns of cortex are interlaced such that small patches of the left and right eye view of the scene are located next to one another in the layer IV of the striate cortex. These interlaced columns are referred to as ocular dominance columns.

Artificial vision systems with a binocular vision capability, including binocular fusion, have a number of uses such as stereo mapping and machine vision depth and three dimensional shape perception. For example, remotely controlled robots can be provided with a surface orientation and depth perception capability. Surface orientation and depth is typically determined by a laser range finding system installed on the robot. The robot transmits a laser beam toward a target object using the system. The beam is reflected from the object and sensed by an onboard sensor which measures the time of laser beam travel. The measured time is subsequently used to determine the distance between the robot and the object. The laser range finding system is disadvantageous because it represents an expense in addition to the cost of a vision system in some robotics systems. Further, many robots are employed in environments where the effects of laser energy impinging on objects are undesirable.

Binocular affine disparity computation can further be applied in realtime data processing in photo databases applications. For example, image mosaicking is needed to generate a photoreal perspective scene from a large quantity of raw satellite imagery taken from various locations. Much of the time spent in geo-correcting is spent in finding the affine disparity between overlapped areas of images taken at different locations by satellites. Current methods for finding affine disparity are based on warp and match paradigm, namely, try various combinations of affine transform and find the best match. The trial and error method confronts combinatorial complexity and has difficulty achieving real-time performance.

The mechanism that fuses two affine related image patterns can also perform affine invariant pattern analysis. Affine invariant pattern analysis has various applications in automatic target recognition, robotics object recognition, automatic terrain tracking for lander guidance, and optical character recognition. Due to changeable viewing condition, the sensor image and stored template of object, target area scene, etc., cannot match exactly. Therefore, to perform affine invariant pattern analysis requires a process that compensates the affine disparity of image patterns.

Stereo mapping involves fusing together two images, for example, of terrain taken from two nearby viewpoints in order to obtain a map which provides three-dimensional information such as terrain elevations and three dimensional surface orientation. These images, for example, can be taken at different but relatively close points in time from an aircraft flying over the terrain. In the past, the images have been fused by a tedious process of matching corresponding terrain features in the two images. A system for stereo mapping has been proposed which employs the binocular fusion capability of a human operator's brain to fuse two images of terrain. The operator views the images through a binocular viewing apparatus and adjusts the apparatus until the images are perceived as fused by the operator. The amount of adjustment yields valuable information regarding binocular disparity; however, the actual fusion of the images onto an elevational map of the terrain continues to require matching some benchmark geographic features. A number of methods have been proposed for implementing binocular vision and determining binocular disparity using machine vision. An important aspect of these proposed methods is the computational problem of detecting features from stereo or binocular images at various spatial resolution levels, and finding their correspondence relations. If the stereo correspondence problem, i.e., feature detection and feature matching, is solved, the measurement of the displacements of the features from one ocular representation to another is straightforward. The problem of matching the features, however, is difficult solve. For example, it is difficult to determine whether a generic feature should correspond to another particular generic feature when there are many candidates. When the visible surface is not in the frontal view, the binocular features may vary in scale and be sheared. Moreover, the problem of feature matching itself is not even a well formulated one since it raises the issue of what kinds of features should be considered generic.

The difficulties of using correspondence relations to determine binocular disparity has resulted in other approaches to the binocular disparity problem. As stated previously, the cells in the visual cortex have a receptive field property. When a visual stimulus is spatially shifted within the scope of the sensitive area of the receptive field of a simple cell, the response of the simple cell changes. The binocular affine disparity problem then becomes one of determining the amount of shift, scale, and shear transforms of the visual stimulus from the differences of the responses of the simple cells. The differential response approach to the disparity problem may take different forms depending on the particular forms of receptive fields being employed in a computational model.

One important differential response model is derived from the Fourier theory of visual information processing. The responses of some cortical cells in vertebrates are tuned to narrow bands of spatial frequencies. In general, Fourier models of vision view the receptive field responses of these cortical cells as frequency specific responses. Consequently, the spatial displacement of visual stimuli is represented by the phase shifts of the frequency specific responses. Using Fourier phase shift theorem, a number of analytical methods for computing disparity from phase differences of spatial frequency specific responses have been proposed, some of which are described in the following publications: A. D. Jepson et al., "The Fast Computation of Disparity From Phase Differences", *IEEE Proceedings on Computer Vision* and Pattern Recognition, pp. 398–403 (1989); and T. D. Sanger, "Stereo Disparity Computation Using Gabor Filters", Biological Cybernetics, vol. 59, pp. 404–418 (1988). The application of the Fourier theorem is problematic, however, because the phase shift derived for the global spatial shift of functions must somehow be made applicable to the non-homogeneous local phenomena of binocular disparities.

In the past, Gabor filters and localized Fourier analysis have been taken as the method to resolve the contradiction between the global nature of the Fourier analysis method and the local nature of displacements of visual stimuli. For example, the local phase information extracted by Gabor filters is exploited for the computation of disparity in the Jepson et al. article, and one dimensional Gabor filters are applied to find local phase difference from which the disparity is calculated in the Sanger article. Nevertheless, the localized Fourier analysis approach to binocular stereo, including those methods using Gabor filters, has limitations. The image disparities are different from place to place. For the local computation of disparity value, the spectral analysis must be performed over a very small image region. Constrained by the limit of image resolution, a local Fourier analyzer usually only contains a few cycles. Typically, these Fourier analyzer are linear bandpass filters with a bandwidth of more than one octave. The spectral location of the extracted response will be uncertain around the central frequency of the local Fourier analyzer. Disparity cannot be accurately determined based on uncertain frequency information.

A binocular model for a simple cell has been proposed by M. Nomura et al. and described in "A Binocular Model for the Simple Cell", Biological Cybernetics, vol. 63, pp. 237–242 (1990), in which binocular simple cells respond with identical receptive fields, but different spatial phases to the linear combination of visual stimuli from two eyes. The simple cells tuned with different binocular phase differences respond to binocular input differently when responding to the disparity associated with the visual stimuli. The disparity thus can be coded in the pattern of simple cell responses. In the models proposed by M. Nomura et al., A. D. Jepson et al., and T. D. Sanger, the basic computation is based on the Fourier phase shift formula even though the Gabor responses from both eyes are regarded as the source information for computing binocular disparity. None of the existing binocular vision models addresses the computational problem of the amount of scale and shear transform of visual stimulus existing in binocular vision. While the amount of shift transform only determines the depth structure of a visible surface, the amount of scale and shear transform further determines the three-dimensional orientation of the surface. The usefulness of the results from these overly simplified approaches is therefore limited.

Besides binocular stereo applications, the model based object recognition which depends upon a comparison of two visual patterns also suffers from the lack of effective means to compute and compensate affine disparity between two image patterns. Current art of automatic pattern analysis systems keeps a large amount of template samples to cover affine variations of the same pattern. Such systems require tremendous computing power and memory storage and have difficulty performing realtime pattern analysis.

SUMMARY OF THE INVENTION

The present invention is based on a Lie group model of cortical processing of visual pattern geometric analysis of primates, including affine parameter extraction from two image patterns and automatic compensation of affine-disparity while measuring differences between two image patterns. The present invention provides method and apparatus for computing image affine disparity which realizes advantages over and overcomes several shortcomings associated with existing approaches which only calculates binocular displacements. The affine disparity between two images described by affine parameters not only provides the information for the depth structure of the object being viewed. With extra affine parameters, it also provides information for object shape description, i.e. local surface three dimensional orientation. The same mechanism for determining affine disparity also measures the distance between two image patterns after their affine disparity is compensated, thus providing an affine invariant pattern analysis for images.

Accordingly, it is an object of this invention to provide a method and apparatus for determining binocular affine disparity which provides depth and shape information simultaneously to overcome a limitation of the current art which only calculates local displacements of binocular images.

It is another object of this invention to provide method and apparatus for determining binocular affine disparity directly and accurately from binocular images, without feature extraction and feature matching, without trial and error, in much the same manner the neural system would perceive the three dimensional world, and avoiding the combinatorial complexity and uncertainty suffered by the current art.

It is another object of this invention to provide method and apparatus for determining the affine invariant pattern class in a model based pattern recognition system by automatically compensating the affine disparity between image patterns.

It is another object of this invention to provide neuron-like geometric computing devices that serve as realtime computational means for providing a cortical representation of local binocular imagery in an HC-reference frame.

It is another object of this invention to provide neuron-like geometric computing devices that serve as realtime computational means for transforming the HC-reference frame.

It is another object of this invention to provide neuron-like geometric computing devices that serve as realtime computational means for extracting the Lie derivatives of the affine transformation group consistent with the above said cortical representation.

It is yet another object of this invention to provide a neural system like analog geometric computing engine that serves as a realtime computational means for determining binocular affine disparity and affine invariant pattern class by a dynamical process of energy minimization.

BRIEF DESCRIPTION OF THE DRAWINGS

These and other features and advantages of the present invention will be more readily apprehended from the following detailed description when read in connection with the appended drawings, in which.

DETAILED DESCRIPTION OF THE PREFERRED EMBODIMENTS

This invention is built around an artificial neural system based on a Lie group model of information processing of binocular affine disparity and affine invariant pattern analysis in hypercolumns (HC) of primate's visual cortex. The affine disparity between two image patterns is the two dimensional affine transform that brings one image pattern to the closest distance from the other. Affine invariant pattern analysis is a method to classify image patterns that treats affine related patterns as in the same pattern class.

In said artificial neural system, a dynamical system is set once two image patterns are input. The state vector of said dynamical system represents parameters of affine transformations and the energy function of said dynamical system represents the square of the Euclidean distance of two views of cortical patterns. A novel method and geometric computing devices for computing hypercolumn (HC) coordinates and affine Lie derivatives are disclosed in another U.S. patent application Ser. No. 08/352,140, filed Dec. 1, 1994, and is summarized below.

In accordance with the present invention, the intensity image of a visible surface $f(x, y)$ is a square integrable ($L^2$) function: $\int\int f^2(x, y) dx dy < \infty$. Here x and y are horizontal and vertical coordinates of pixels.

In accordance with the present invention, the HC-reference frame comprises a plurality of pairs of linear simple cells. Each said pair comprises a first-view simple cell and a second-view simple cell having a common normal receptive field function $g_i$, $i=1, \ldots, n$, where n is the total number of the simple cell pairs in the HC-reference frame. In the preferred embodiment, the receptive field functions of first-view simple cells can be affine transformed and are functions of affine parameters $g_i(\rho)=A^*(\rho) \circ g_i$, where $A^*(\rho)$ is a two dimensional (2D) affine transform, $\rho=(\rho_1, \ldots, \rho_l)$ is the parameter vector of the 2D affine transform, and $l (\leq 6)$ is the number of affine transform parameters employed in the process. The receptive field functions of simple cells are vectors in the dual space of the $L^2$ space of the images: Each $g_i$ is a reference vector (functional) on $L^2$. Collectively, in the preferred embodiment of current invention, the receptive field functions $g_i$, $i=1, \ldots, n$, constitute a static HC-reference frame for second-view images and $g_i(\rho)$, $i=1, \ldots, n$, constitutes a dynamical HC-reference frame for first-view images.

The set of values $$Y_2^i = (g_i, f), i=1, \ldots, n. \tag{1}$$

provides a second-view HC-representation for the image pattern f, where $(g_i, f)$ is the Hilbert space inner product of f and $g_i$. The first-view HC-representation is provided in a similar manner via inner product with $g_i(\rho)$:

$$\gamma_1^i(\rho) = (g_i(\rho), f), i=1, \ldots n. \tag{2}$$

With reference to Equations 1 and 2, $\vec{\gamma}_1(\rho) = (\gamma_1^1(\rho), \ldots, \gamma_1^n(\rho))$ and $\vec{\gamma}_2 = (\gamma_2^1, \ldots, \gamma_2^n)$ are the first-view and second-view HC-coordinate vectors of a retinal intensity image (briefly, retinal image, or simply image) $f(x, y)$, respectively. In the preferred embodiment, the j-th Lie derivative of the i-th HC-coordinate component $\gamma_1^i(\rho)$ of f is $$\Omega_j^i = \langle A^*(\rho) \circ g_{ij}, f \rangle$$

where $g_{ij} = X_j^* \circ g_i$, is a Lie germ and $X_j^*$ is the Hilbert space conjugate of the infinitesimal generator of the j-th 1-parameter Lie subgroup of the 2D affine Lie group $A(2, R)$.

Briefly, a novel method for determining affine disparity and affine invariant distance between two image patterns in accordance with the present invention which uses a dynamical system is provided. In addition, a closed loop adaptive HC-reference frame is provided as an analog implementation of said dynamical system.

The novel method of current invention uses HC-coordinate vectors to represent light intensity information from an image pair comprising a first image and a second image in two separated views: first-view and second-view. In the preferred embodiment, said image pair can be the binocular images taken by two cameras being positioned parallel to each other and having a common image plane.

For illustrative purposes, it is convenient to introduce a viewer centered coordinate system for a binocular imaging system and denote the one associated with the first camera as OXYZ and such that the image plane is the plane Z=1, and the focus of the perspective projection is the origin O. The x axis and the y axis of the coordinate system oxy on the image plane are parallel to the X axis and Y axis, respectively. The origin of the image plane is at (0,0,1). The viewer centered coordinate system associated with the second camera O'X'Y'Z' and its image plane coordinate system o'x'y' are defined similarly. System O'X'Y'Z' is related to system OXYZ by a spatial shift of amount t along the X axis. Using the above introduced coordinate systems, the binocular differences of the image taken by said first camera and the image taken by said second camera is the following affine transformation $A(\alpha, \beta, \tau)$:

$$\begin{pmatrix} x' \\ y' \end{pmatrix} = A(\alpha, \beta, \tau) \begin{pmatrix} x \\ y \end{pmatrix} \tag{3}$$

$$= \begin{pmatrix} 1-\alpha & \beta \\ 0 & 1 \end{pmatrix} + \begin{pmatrix} \tau \\ 0 \end{pmatrix}.$$

In APPENDIX A, it is shown that the normal vector of the visible surface, $(\omega_{31}, \omega_{32}, \omega_{33})$, which gives three dimensional orientation of the surface, is related to affine parameters $\alpha, \beta, \tau$:

$$(\omega_{31}, \omega_{32}, \omega_{33}) = (\alpha/l, \beta/l, \tau/l) \quad (4)$$

where $l=\sqrt{\alpha^2+\beta^2+\tau^2}$ is the Euclidean norm of vector $(\alpha, \beta, \tau)$, and the depth $Z_0$ of the surface patch with image coordinates around $(x_0, y_0)$ is $$Z_0 l/(\omega_{31} x_0 l \omega_{32} y_0 l + \omega_{33} l). \quad (5)$$

Thus, three dimensional shape and depth of a visible surface are determined once the binocular affine disparity, the values of $\alpha$, $\beta$, and $\tau$, are determined.

A general mathematical scheme for determining affine disparity and affine invariant distance between two visual patterns is shown in APPENDIX B. The novel method of the current invention uses a dynamical HC-reference frame to represent light intensity information from two images, and results in two views of HC-coordinate vectors, one for the first image and one for the second image. In general, these two HC-coordinate vectors are different. In the preferred embodiment, the method measures affine disparity by affine transforming the first-view HC-reference system to achieve identical or the closest possible HC-representations of two images. The affine invariant pattern distance is the Euclidean length of the difference vector of the closest possible HC-representations of two image patterns. It will be zero when one image pattern is an affine variation of the other, such as in binocular vision, or in pattern analysis where one is the template of an input image pattern. The distance will be greater than zero if two patterns are not in the same affine invariant class.

For illustrative purposes, the embodiment of an artificial neural system for determining affine disparity and affine invariant distance between two image patterns being described in the following is a binocular vision system, in which only three affine parameters, denoted as $\alpha$, $\beta$, and $\tau$, are involved. In general, all the six affine parameters may be involved in the process of determining affine disparity and affine invariant distance between two image patterns. The generalization and modification from a system involving three affine parameters to a system involving more affine parameters are within reach of the ordinary skill of art.

With further reference to FIG. 2, right and left ocular images R(x, y) 24 and L(x, y) 26 are illustrated as seen, for example, from the corresponding right eye and left eye of a vertebrate. At position $(x_0, y_0)$ in the right and left images, the binocular disparity is represented as $A(\alpha_0, \beta_0, \tau_0)$. The right and left images are substantially the same, i.e., the intensity of corresponding pixels is practically identical. The left and right images, however, are affine transformed with respect to each other. Thus at a small neighborhood centered around $(x_0, y_0)$, the right image R(x, y) and left image L(x, y) have the following relation:

$$R(x,y)=A(\alpha_0, \beta_0, \tau_0) \circ L(x,y) \quad (6)$$

In HC-representation, Equation 6 leads to the following system of equations:

$$<g_i, R> = <g_i, A(\alpha_0, \beta_0, \tau_0) \circ L>, \, i=1, \ldots, n.$$

The novel method of current invention determines binocular affine disparity $A(\alpha_0, \beta_0, \tau_0)$ by finding an affine transform $A^*(\alpha_0, \beta_0, \tau_0)$ acting on the HC-reference frame that is conjugate to $A(\alpha_0, \beta_0, \tau_0)$:

$$(g_i, R) = A^*(\alpha_0, \beta_0, \tau_0) \circ g_i, L), \, i=1, \ldots, n. \quad (7)$$

The method of current invention is different from the method suggested by Anderson and Van Essen ("Shifter circuits: a computational strategy for dynamic aspect of visual processing, *Proceedings of National Academy of Sciences, U.S.A.* 84, 6297–6301, 1987). The method of this invention does not transform one of the two images to match the other. Instead, the method of current invention transforms the receptive fields of simple cells in the first-view HC-reference frame to maximally compensate the affine difference and minimize the distances of HC-vectors of the two images, and thereby determine affine disparity and affine invariant pattern distance between the two images.

Binocular fusion can be a left-ocular dominated process in which the resulting fused view will be the same as left-ocular view, or a right-ocular dominated process in which the resulting fused view will be the same as right-ocular view, or a balanced process in which the resulted fused view is in the between of two ocular views. As will be described in further detail below in connection with FIG. 5, in the preferred embodiment, the system is a right-ocular dominated system. In this system, the HC-reference frame of second-view, which represents the right-ocular image, is static and the HC-reference frame of first-view, which represents the left-ocular image, is adaptive. According to the present invention, and with reference to Equation 7, the binocular disparity problem is solved by finding a small affine transformation $A^*(\alpha, \beta, \tau)$ for the first-view HC-reference frame such that the HC-coordinate vectors of first-view and second-view representations are equal, namely:

$$\delta^i(\alpha,\beta, \tau)=\gamma_2^i-\gamma_1^i(\alpha, \beta, \tau)=0, \, i=1, \ldots, n. \quad (8)$$

where $$\gamma_1^i(\alpha, \beta, \tau)=<A^*(\alpha, \beta, \tau) \circ g_i, L>, \, i=1, \ldots, n$$

are components of the HC-coordinate vector of the left-ocular image in an affine transformed HC-reference frame, and $$\gamma_2^i=<g_i, R>, \, i=1, \ldots, n$$

are components of the HC-coordinate vector of the right-ocular image. System of Nonlinear Equations 8 is preferably solved using a dynamical system having an energy function. The dynamical system reaches an equilibrium state where the energy function has a minimum value. In accordance with current invention, the energy function is chosen to be the square of the length of the difference vector of first-view and second-view HC-coordinate vectors:

$$E(\alpha, \beta, \tau) = \sum_{i=1}^{n} (\delta^i(\alpha, \beta, \tau))^2.$$

Such a dynamical system can be properly constructed provided the Lie derivatives of $\delta^i(\alpha, \beta, \tau)$ can be calculated. The use of HC-representation is advantageous because, among other reasons, the Lie derivatives of $\delta^i(\alpha, \beta, \tau)$ can be calculated using Lie germs described in the above-referenced U.S. patent application Ser. No. 08/352,140, Filed Dec. 1, 1994. In the preferred embodiment, affine disparity $A^*(\alpha_0, \beta_0, \tau_0)$ of binocular images is determined at the minimum energy point $(\alpha_0, \beta_0, \tau_0)$ of the gradient system:

$$(d\alpha/dt, \, d\beta/dt, \, d\tau/dt)=-\nabla E(\alpha, \beta, \tau),$$

where $$\nabla E = (\partial E/\partial\alpha,\ \partial E/\partial\beta,\ \partial E/\partial\tau),$$

and $$\partial E/\partial\alpha = -2\sum_{i=1}^{n}\delta^{i}\Omega_{\alpha}^{i},\ \partial E/\partial\beta = -2\sum_{i=1}^{n}\delta^{i}\Omega_{\beta}^{i},\ \partial E/\partial\tau = -2\sum_{i=1}^{n}\delta^{i}\Omega_{\tau}^{i}.$$

In accordance with current invention, the Lie derivative $\Omega_{\alpha}^{i}$ of $\delta^{i}$ is calculated using expression:

$$\Omega_{\alpha}^{i} = <A^{*}(\alpha,\beta,\tau) \circ g_{i,\alpha}, L>,$$

where $g_{i,\alpha}$ is the i-th Lie germ of the infinitesimal generator of the one parameter Lie subgroup of parameter $\alpha$. Similarly $\Omega_{\beta}^{i}$ and $\Omega_{\tau}^{i}$ are calculated. Also the affine invariant distance between two image patterns L and R are determined at the same minimum energy point $(\alpha_0, \beta_0, \tau_0)$:

$$d_H(L,R) = |\vec{\delta}(\alpha_0, \beta_0, \tau_0)|_H$$

where $\vec{\delta}$ is an n-dimensional vector $(\delta^1, \ldots, \delta^n)$.

It is understood that other numerical schemes for solving system of non-linear equations also can be used to find approximate solution of System of Equations 8. For example, the multi-dimensional Newton method using Lie derivative information also can be applied to find approximate solution for System of Equations 8. The use of gradient system is advantageous because it finds the minimum distance between two image patterns by compensating affine disparities, even when two images R and L are not related by System of Equations 8, as in general affine invariant pattern analysis.

Figure 4:
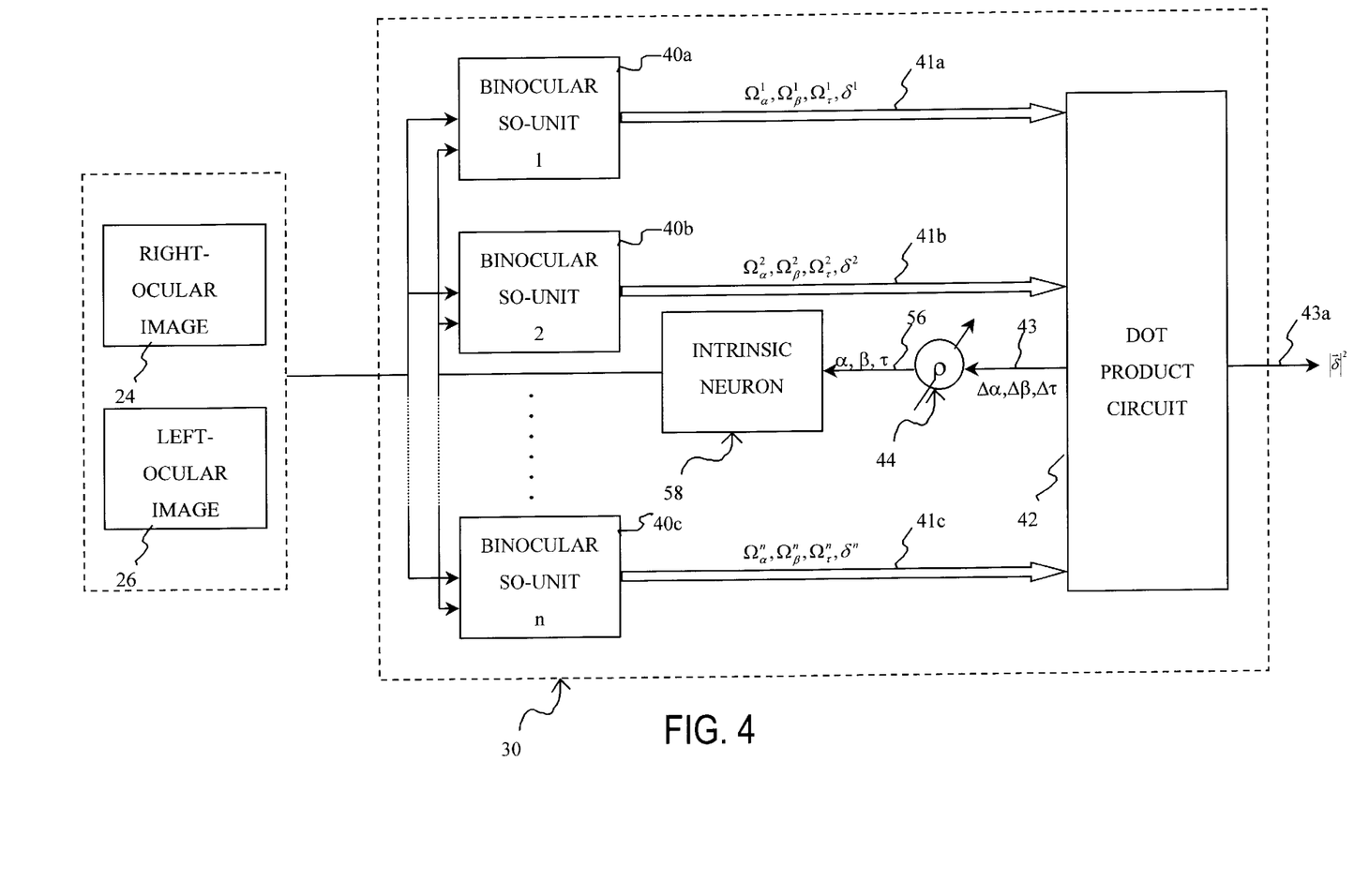
FIG. 4 is a schematic diagram of a closed loop, dynamical HC-coordinate system constructed in accordance with the present invention to determine binocular affine disparity and affine invariant pattern distance.

As will be described in further detail below in connection with FIG. 4, Lie derivatives $\Omega_{\alpha}^{i}$, $\Omega_{\beta}^{i}$, $\Omega_{\tau}^{i}$ and difference value $\delta^{i}$ can be obtained from response signals of Lie germs and specific orientation (SO) simple cells. The circuit of adaptive HC-reference frame is described with reference to FIGS. 4 and 5. The circuit depicted in FIG. 4 is configured using a gradient scheme to determine the affine disparity $A(\alpha_0, \beta_0, \tau_0)$ and affine invariant pattern distance $|\vec{\delta}_0|_H$, where $\vec{\delta}_0$ is the difference vector $(\delta_0^1, \ldots, \delta_0^n)$ when the dynamical system converged to the minimum energy. The blocks shown in FIG. 4, which perform mathematical operations using binocular image data, can be implemented as one or more analog circuits or as a programmed sequence of operations performed by a digital computer.

Figure 5:
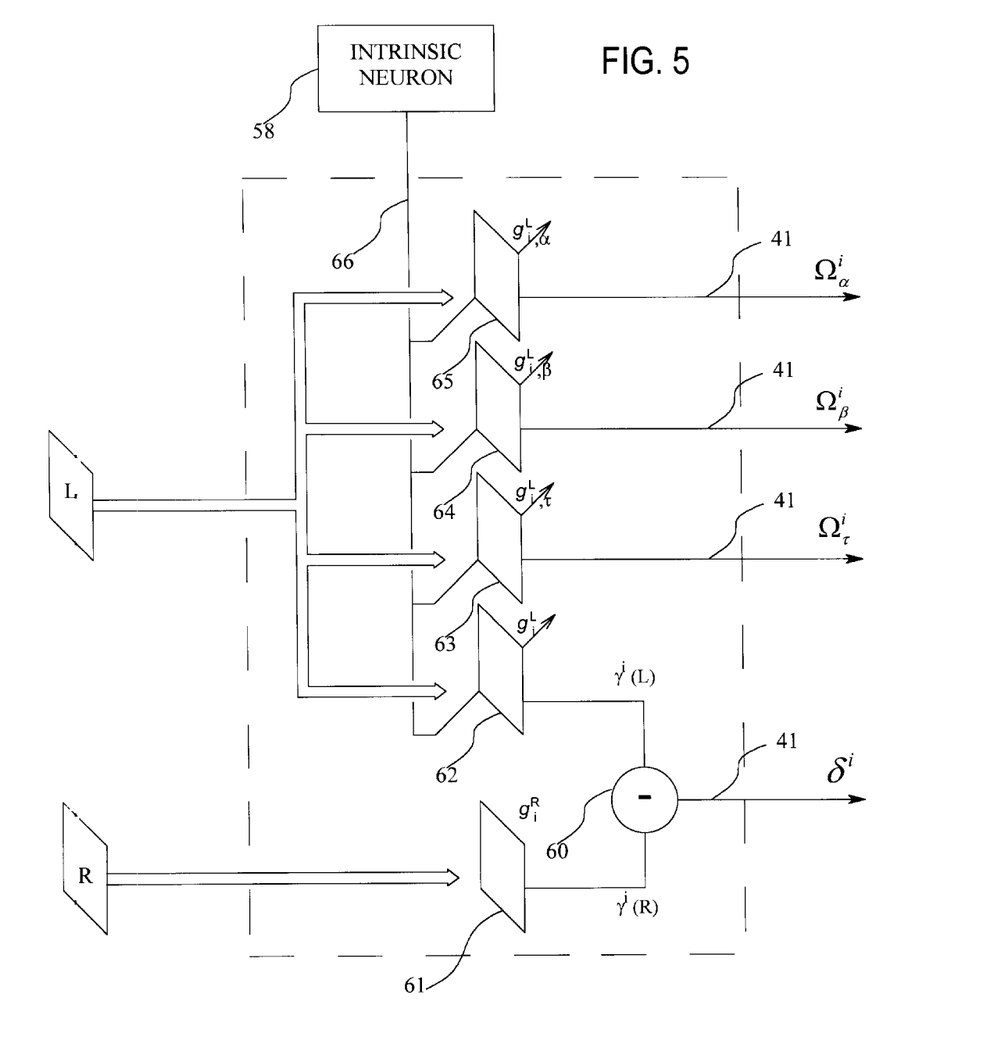
FIG. 5 depicts a right-ocular dominant binocular pair of specific orientation (SO) columns in visual cortex.

With continued reference to FIG. 4, the adaptive HC-reference frame circuit 30 receives data from right-ocular and left-ocular images 24 and 26, respectively. The adaptive HC-reference frame circuit 30 comprises a system of n SO-units 40 for computing $\delta^{i}$, the difference of projections of the right image data and the left image data on said SO-unit, and $\Omega_{\alpha}^{i}$, $\Omega_{\beta}^{i}$, $\Omega_{\tau}^{i}$, the Lie derivatives of $\delta^{i}$ with respect to affine parameters $\alpha$, $\beta$, and $\tau$. With reference to FIG. 5, a right-ocular dominant SO-unit 40 further comprises a second-view simple cell 61, a first-view simple cell 62, three first-view Lie germs 63, 64, 65, an intrinsic neuron 58 accompanying the first-view simple cells and Lie germs, and a subtracter 60. The first-view simple cell 62 and Lie germs 63, 64, 65 are configured to be affine transformable upon receiving influential field signal from the accompanying intrinsic neuron 58, to accommodate the binocular affine disparity.

Figure 6:
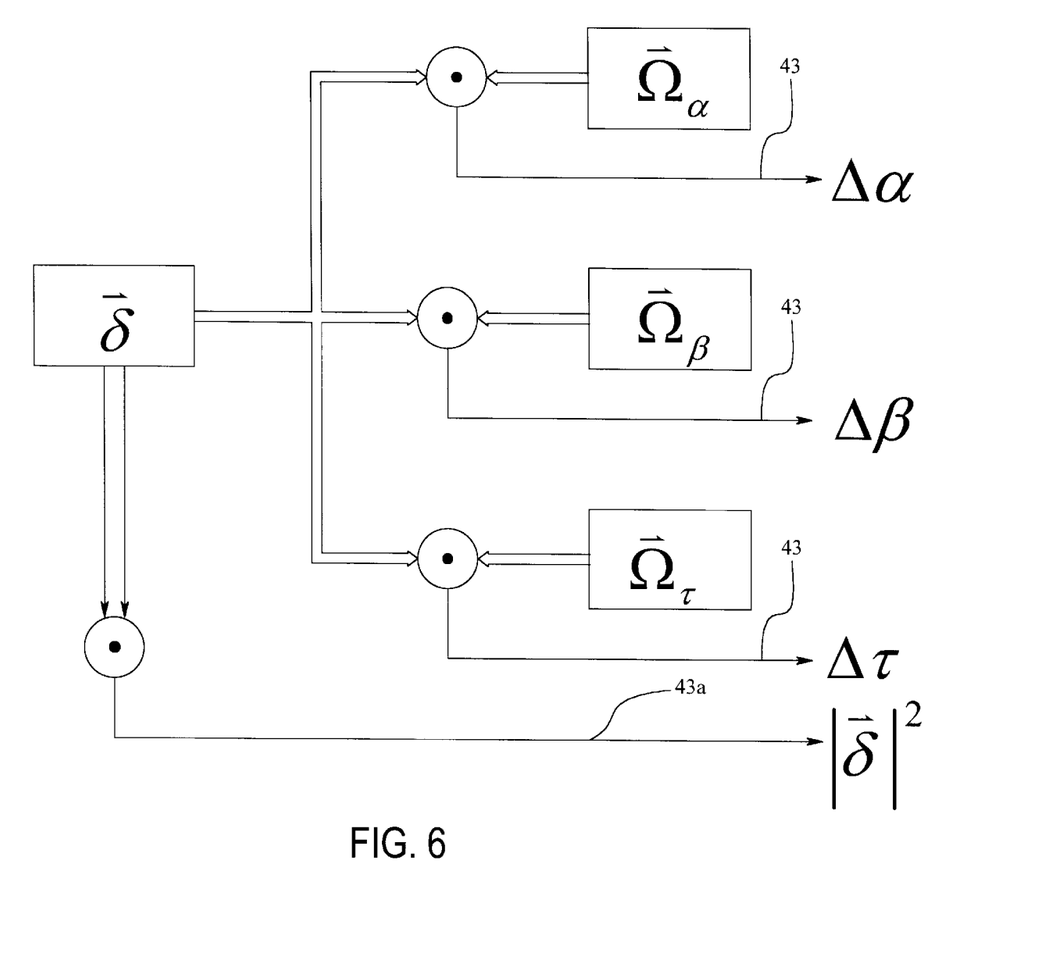
FIG. 6 is a schematic diagram of a circuit constructed in accordance with the present invention to compute the increment of the state vector and the energy of the dynamical system from the updated Lie derivatives and difference vector after adaptively affine transforming the first-view frame.

With further reference to FIG. 4, the output signals 41 of n SO-units, $\Omega_{\alpha}^{i}$, $\Omega_{\beta}^{i}$, $\Omega_{\tau}^{i}$, $\delta^{i}$, i=1, . . . , n, are supplied to DOT-Product circuit 42. With reference to FIG. 6, the DOT-Product circuit receives the output signals 41 (not shown in figure) from n SO-units and provides state vector increment signal 43 $\Delta\rho$ and energy value 43a $|\vec{\delta}|^2$ by dot products of $\vec{\delta}$ with $\vec{\Omega}_{\alpha}$, $\vec{\Omega}_{\beta}$, $\vec{\Omega}_{\tau}$, and $\vec{\delta}$, respectively. The output signal of DOT-Product circuit, $|\vec{\delta}|^2$ 43a and $\Delta\rho=(\Delta\alpha, \Delta\beta, \Delta\tau)$ 43, modifies energy function $E(\rho)$ and the state vector $(\alpha, \beta, \tau)$ of the system. The state vector $\rho$ in turn controls further adjustments of the adaptive first-view simple cells in the HC-reference frame via a feedback circuit in a manner described below in connection with FIG. 7.

The SO-units preferably process data from two input image patterns in accordance with the feedback data $\Delta\rho=(\Delta\alpha, \Delta\beta, \Delta\tau)$ until the minimum energy is reached. At the minimum energy state, the difference between two views is minimum, and the receptive fields of first-view simple cells are transformed an amount $A^{*}(\alpha, \beta, \tau)$ that is substantially conjugate to the binocular disparity: $A(\alpha, \beta, \tau) \approx A(\alpha_0, \beta_0, \tau_0)$. Upon convergence, and with reference to Equation 6, $$\gamma_1^{i}(\alpha_0, \beta_0, \tau_0) = \gamma_2^{i},$$

and $$\delta^{i} = \gamma_2^{i} - \gamma_1^{i}(\alpha_0, \beta_0, \tau_0) = 0,\ i=1, \ldots, n.$$

Thus, the closed loop adaptive HC-reference frame is configured to model the manner in which cortical cells from a binocular pair represents the image with identical cortical responses upon fusion.

An advantage of the present invention is that it attempts fusion of two images along with the determination of binocular disparity. When substantially all of the adaptive receptive fields of the first-view simple cells in a right-ocular dominant system have converged, not only are the binocular affine disparities determined, but also the difference of the HC-representations of the two image patterns is minimized. The Euclidean norm of the minimum difference vector of the first- and second-view HC-vectors is affine invariant. And the cortical representations of binocular images are substantially identical. Accordingly, binocular fusion is accompanied by the process of computation of the binocular disparity.

In accordance with another aspect of present invention, the adaptive receptive fields of the first-view simple cells 62 as well as the first-view Lie germs 63, 64, 65 comprises a neural network implementation of an affine transform mechanism for adjusting the simple cells 62 and the Lie germs 63, 64, 65, that is, the weights of the synapses of their receptive fields in accordance with the values of $\alpha$, $\beta$, $\tau$. The affine transform mechanism is a neural function which transforms a two-dimensional cortical cell receptive field using neural computational primitives.

Figure 7:
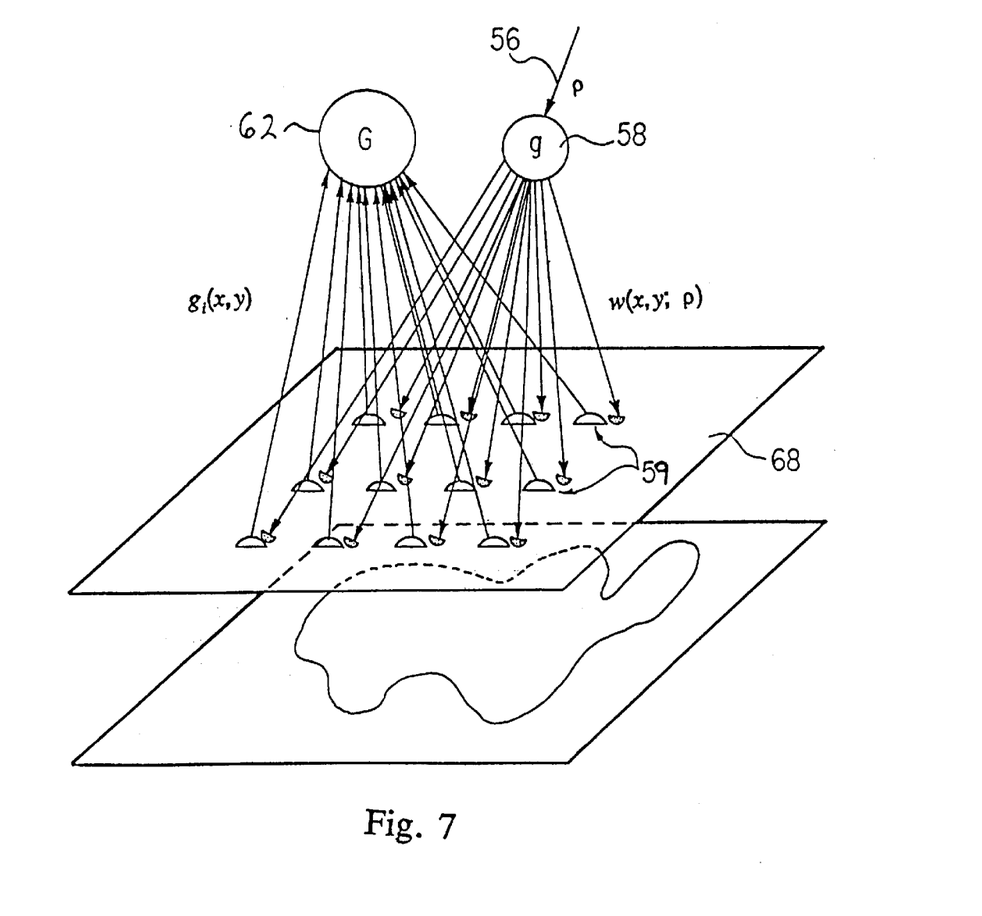
FIG. 7 depicts an influential field adjusting the receptive field of a neuron.

The affine transform mechanism of intrinsic neuron 58 is schematically illustrated in FIG. 7. In order to change the linear processing property of the receptive field, i.e., a response of one of the HC-cells 62i, 63i, 64i, 65i, i=1, . . . , n, the synaptic weights in the receptive field are preferably changed in a global and coordinated manner. Accordingly, the affine transforming circuit 58 is realized by an intrinsic neuron having an influential field, the neural function of which is to translate the input signal $\rho=(\alpha, \beta, \tau)$ from affine transforming control circuit 44 into an output spatial function $w(x,y; \rho)$. The spatial function is applied to the synapses 59 on the receptive field 68 associated with each of the simple cells to influence the linear processing property of its receptive field in a basically multiplicative manner. The output signals applied to each of the HC-cells 62i, 63i, 64i, 65$i$ are represented schematically in FIG. 5 by arrows 66. With reference to FIG. 4, the application of function w(x,y; ρ) to the receptive field is controlled by an affine transforming control circuit 44, the output signal ρ 56 of which is applied to the affine transforming circuit 58. When Δρ=0, the affine transforming control circuit 44 reflects that there is no more change as result of affine transforming the first-view HC-cells receptive fields, i.e., disparity is determined, and the intrinsic neuron ceases adjusting the inputs 66 to the receptive fields of the HC-cells 62$i$, 63$i$, 64$i$, 65$i$.

The output signal of the affine transform mechanism 58 is an affine transform operator A*(α, β, τ). For pure translation τ, the affine transform operator A*(0,0,τ) is preferably carried by a simple function w(x,y; ρ)=w(x,y; 0,0,τ) which can be implemented by neural primitive computations, as can be the computations performed by the Gabor receptive fields functions of cortical simple cells $$g_i(x,y) = \exp\{-\pi[x^2 a^2 + y^2 b^2]\} \cdot \exp\{-2\pi j[v_x^i x + v_y^i y]\}.$$

Figure 8:
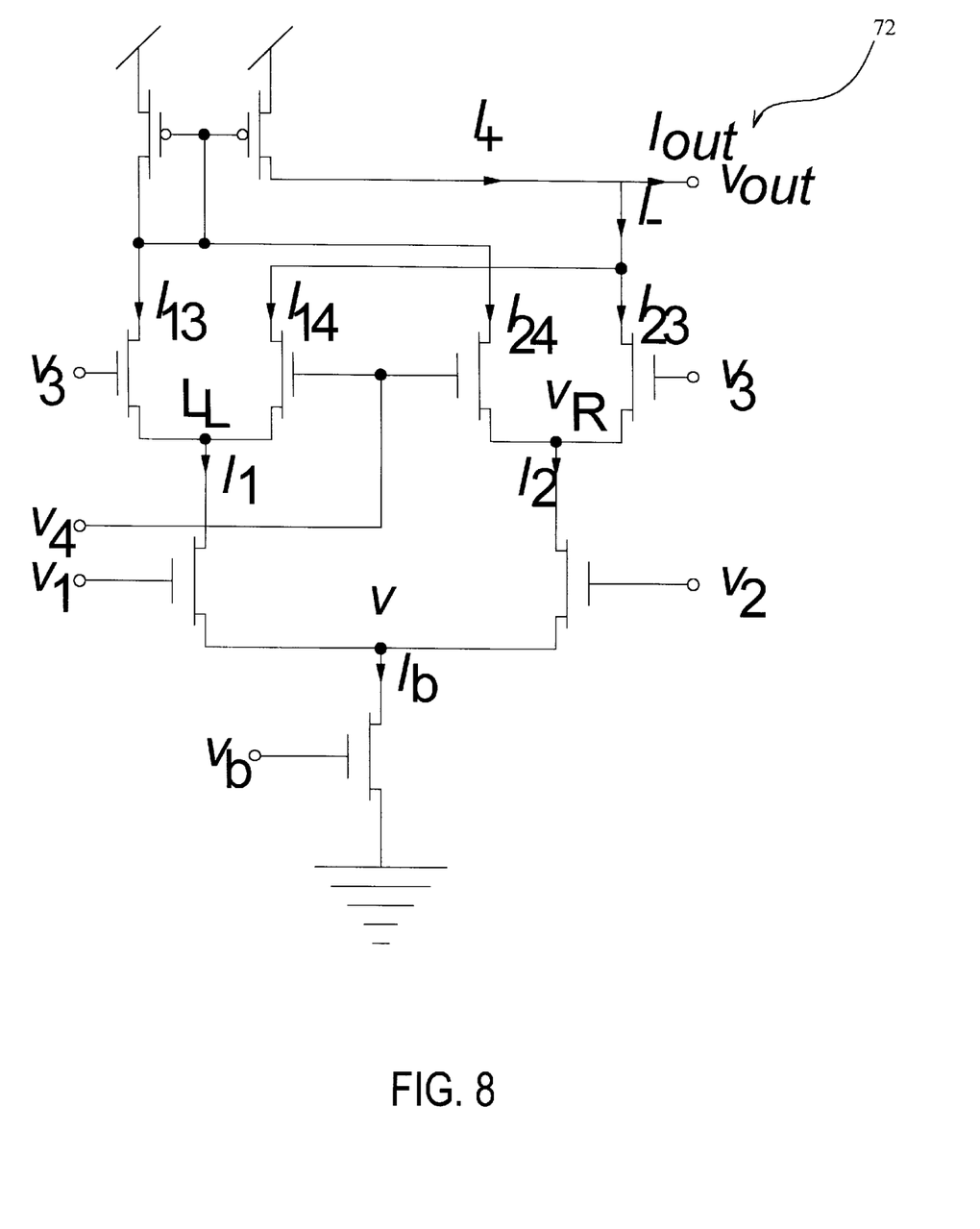
FIG. 8 is a schematic diagram of an analog multiplicative circuit.
Figure 9:
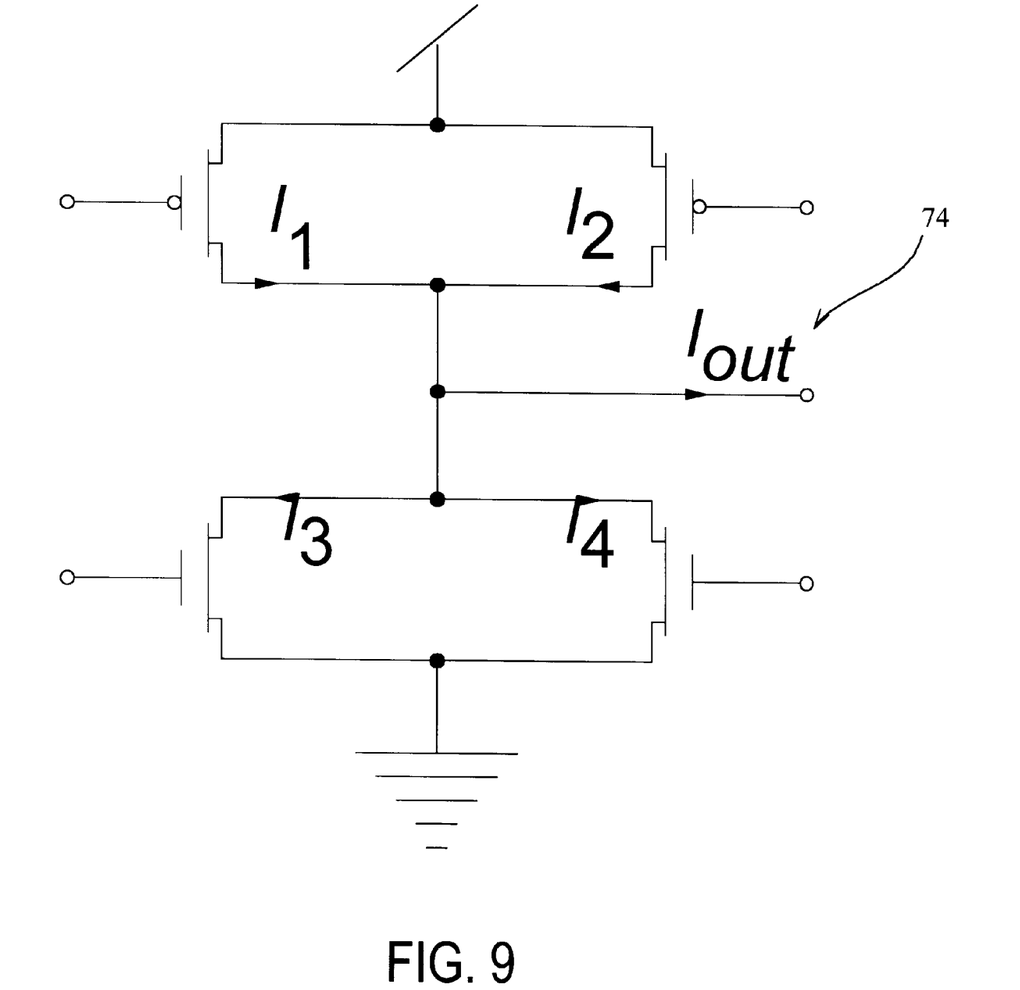
FIG. 9 is a schematic diagram of an analog adder circuit.

With the Gabor function, $$A^*(0, 0, \tau) \circ g_i(x, y) = \exp\{-\pi[(x-\tau)^2 a^2 + y^2 b^2]\} \cdot$$
$$\exp\{-2\pi j[v_x^i(x-\tau) + v_y^i y]\}$$
$$= w(x, y; 0,0, \tau) \cdot g_i(x, y)$$

where w(x,y; 0,0,τ)=exp[πa²(2xτ−τ²)+2πj$v_x^i$τ] is the influential field function. The influential field can be implemented by primitive neural computations using circuits described below, for example, negative feedback loops and the analog components depicted in FIGS. 8 and 9. For general affine transforms, local exponential mapping and logarithm mapping, which also are part of neural primitive computations performed by analog microcircuits of neural system, will be involved besides the multiplicative connections. Thus, with continued reference to FIG. 7, the computational structure of the adjustable simple cell receptive fields A*(α, β, τ)∘$g_i$ is determined by the interaction of a fixed receptive field $g_i$(x, y) 59 and the output analog signal of the influential field w(x,y; ρ). For a pure shift, the interaction is basically a multiplication, i.e. A*(0,0,τ)∘$g_i$(x, y)=$g_i$(x,y)w(x,y; 0,0,τ). The adaptive HC-reference frame circuit 30 and the neural implementation of the affine transforming mechanism 58 is advantageous over existing affine disparity computing systems that shift or affine transform the images themselves as opposed to that shift or affine transform the receptive field function. Receptive field function affine transforming is simpler to implement than image affine transforming because receptive field functions have known analytical form. Further, most disparity computing methods involving image shifting allow for only integer valued shifts, i.e., shifts based on a number of pixels. In contrast, the present invention is not constrained to integer valued shifts.

In addition to the feedback circuitry, the simple cells and Lie germs 61, 62, 63, 64, and 65, and the arithmetic circuit 60 depicted in FIG. 5 can also be implemented by primitive neural computations and are therefore realizable as analog circuits. For example, the simple cells and Lie germs may each comprise a massive array of resistors with multiple inputs. The controller 44 and the DOT-Product circuit 42 in FIG. 4 can each be implemented as a Gilbert transconductance multiplier 72 which is depicted in FIG. 8. The subtractor 60 can be implemented as a basic Kirchoff adder circuit. As shown in FIG. 9, the Kirchoff adder circuit 74 comprises p-channel and n-channel transistors, the drain currents of which are added and subtracted in accordance with Kirchoff's laws.

The implementation of adaptive HC-reference frame network depicted in FIG. 4 using real-time, analog circuits is advantageous in such applications as robotics because of their low energy consumption. The adaptive HC-reference frame network can also be implemented at real-time frame rates using high speed digital hardware such as a processor-controlled connection system designed for use in neural network systems.

The present invention has a number of advantages. For example, the gradient system method of pattern distance minimization and root finding is significantly more efficient than schemes employing small image patch cross-correlation. Most of the efficiency is provided by the Lie derivative information associated with the Lie germs 63, 64, and 65, depicted in FIG. 5. According to the above-referenced method proposed by Anderson and Van Essen, the spatial shift of the receptive field was performed by the shift registers working on shifting the image pixels. The amount of spatial shift from the derivative computation associated with the gradient system method is usually not an integer step, whereas the shift operation on the images is constrained to integer steps. In accordance with the present invention, spatial shift can be applied on the adaptive simple cells instead of on the images themselves. Since the HC-cell receptive field functions are analytically defined, practically all real number spatial shifts are permitted. In addition, the concept of an adjustable HC-reference frame has far reaching consequences beyond simply eliminating difficulties associated with spatial shift in an image. Adjustable HC-reference frame also suggests a closed loop adaptation process which is employed in accordance with the present invention.

Due to the simple analytical form of simple cell receptive field functions, the structure of the spatial shift operation, as well as other affine transformations, on the cortical simple cells has a simple mathematical form. By formulating affine disparity computation as a process of minimization of $|\vec{\delta}|_H$, the neural dynamical system determines the affine invariant pattern distance of two images as a byproduct of the process of extracting affine disparity information. Binocular convergence is possible once binocular disparity is known and completely compensated by the affine transform of the adaptive HC-reference frame. Thus, the HC-representation of the binocular images are fused.

Although the present invention has been described with reference to a preferred embodiment, the invention is not limited to the details thereof. Various modifications and substitutions will occur to those of ordinary skill in the art, and all such modifications and substitutions are intended to fall within the spirit and scope of the invention as defined in the appended claims.

APPENDIX A

For illustrative purpose, it is convenient to use a viewer centered coordinate system, and denote the one associated with the first camera as OXYZ such that the image plane is the plane Z=1, and the focus of the projection is the origin, O. The x axis and the y axis of the coordinate system oxy on the image plane are parallel to the X-axis and Y-axis, respectively. The origin o of the oxy coordinate system is at (0, 0, 1) (FIG. 1). Similarly, denote the one associated with the second camera O'X'Y'Z' and its image plane coordinate system o'x'y'. System O'X'Y'Z' by a spatial shift of amount t along X axis.

In this configuration, a physical point P at position (X,Y, Z) has image coordinate $$\begin{pmatrix} x \\ y \end{pmatrix} = \begin{pmatrix} X/Z \\ Y/Z \end{pmatrix}.$$

Its coordinate in the O'X'Y'Z'-system is $$\begin{pmatrix} X' \\ Y' \\ Z' \end{pmatrix} = \begin{pmatrix} X-t \\ Y \\ Z \end{pmatrix}.$$

And the corresponding image coordinate in the o'x'y'-system is $$\begin{pmatrix} x' \\ y' \end{pmatrix} = \begin{pmatrix} (X-t)/Z \\ Y/Z \end{pmatrix} = \begin{pmatrix} x - t/Z \\ y \end{pmatrix}.$$

Let $\omega_1$, $\omega_2$, $\omega_3$ be three vectors, where $\omega_1 = (\omega_{11}, \omega_{12}, \omega_{13})$,
$\omega_2 = (\omega_{21}, \omega_{22}, \omega_{23})$,
$\omega_3 = (\omega_{31}, \omega_{32}, \omega_{33})$, and let following $P_0$-$\omega_1\omega_2\omega_3$-coordinate system be attached to a point $P_0$ on a smooth physical surface: The first two of the reference vectors, $\omega_1$, $\omega_2$, are a pair of orthogonal vectors on the tangent plane of the visible surface, and the third one, $\omega_3$, is the normal vector of the visible surface. The center of the coordinate system is at $P_0 = (X_0, Y_0, Z_0)$.

Let $(\xi, \eta, \zeta)$ be the $P_0$-$\omega_1\omega_2\omega_3$-coordinate of a physical point P on the visible surface nearby the physical point $P_0$. Its OXYZ-coordinates will be:

$$\begin{pmatrix} X \\ Y \\ Z \end{pmatrix} = (\omega_1, \omega_2, \omega_3) \begin{pmatrix} \xi \\ \eta \\ \zeta \end{pmatrix} + \begin{pmatrix} X_0 \\ Y_0 \\ Z_0 \end{pmatrix}.$$

And its O'X'Y'Z'-coordinates will be:

$$\begin{pmatrix} X' \\ Y' \\ Z' \end{pmatrix} = (\omega_1, \omega_2, \omega_3) \begin{pmatrix} \xi \\ \eta \\ \zeta \end{pmatrix} + \begin{pmatrix} X_0 - t \\ Y_0 \\ Z_0 \end{pmatrix}.$$

Now, suppose a point p on the image plane has oxy-coordinate (x, y), and is in the neighborhood of point $p_0$, which is the image point of $P_0$ and has coordinate $(x_0, y_0)$. The Z-coordinate of the physical point P on the visible surface that generates image point p will be:

$$Z = (\omega_{31}X_0 + \omega_{32}Y_0 + \omega_{33}Z_0)/(\omega_{31}x + \omega_{32}y + \omega_{33})$$

And the o'x'y'-coordinates of the image point of the physical point P will be:

$$\begin{pmatrix} x' \\ y' \end{pmatrix} = \begin{pmatrix} x - t/Z \\ y \end{pmatrix} = \begin{pmatrix} x - \alpha x + \beta y + \tau \\ y \end{pmatrix}$$

where $\alpha = t\omega_{31}/(\omega_{31}X_0 + \omega_{32}Y_0 + \omega_{33}Z_0)$, $\beta = t\omega_{32}/(\omega_{31}X_0 + \omega_{32}Y_0 + \omega_{33}Z_0)$, and $\tau = t\omega_{33}/(\omega_{31}X_0 + \omega_{32}Y_0 + \omega_{33}Z_0)$.

Thus, we have the affine transform between the coordinates of oxy-system and o'x'y'-system:

$$\begin{pmatrix} x' \\ y' \end{pmatrix} = A(\alpha, \beta, \tau) \begin{pmatrix} x \\ y \end{pmatrix}$$

$$= \begin{pmatrix} 1-\alpha & \beta \\ 0 & 1 \end{pmatrix} + \begin{pmatrix} \tau \\ 0 \end{pmatrix}$$

and the normal vector of the visible surface $(\omega_{31}, \omega_{32}, \omega_{33})$, which gives three dimensional orientation of the surface, is $$(\omega_{31}, \omega_{32}, \omega_{33}) = (\alpha/l, \beta/l, \tau/l)$$

where $l = \sqrt{\alpha^2 + \beta^2 + \tau^2}$ is the Euclidean norm of the vector $(\alpha, \beta, \tau)$, and the depth $Z_0$ of the surface patch with image coordinate $(x_0, y_0)$ is $$Z_0 = t/(\omega_{31}x_0 l + \omega_{32}y_0 l + \omega_{33}l).$$

APPENDIX B

Let $A(\rho)$ be a two dimensional (2D) affine transform, where $\rho = (\rho_1, \rho_2, \ldots, \rho_6)$ is the parameter vector. Let $A(R, 2) = \{A(\rho) | \rho \in R^6\}$ be the Lie group of 2D affine transforms. Given a 2D pattern f(x,y), $(A(\rho) \circ f)(x, y)$ is the image of the 2D pattern f under the affine transform $A(\rho)$. The set $$\text{Traj}(f, A(R,2)) = \{A(\rho) \circ f | \rho \in R^6\}$$

is called the orbit (or trajectory) of the pattern f under the 2D affine transformation group A(R,2). Considering f as a vector in Hilbert space $L^2$, and introducing a topology with the $L^2$ metric, the orbit off under A(R,2) will be a six dimensional manifold.

Let $f_0$ be another 2D pattern, say, a template. The distance between f and $f_0$, $d(f, f_0)$, can be defined as the Hilbert space distance of the vector $f_0$ to the orbit Traj(f, A(R,2)):

$$d(f, f_0) = \min_{\rho \in R} |A(\rho) \circ f - f_0|_{L^2}$$

The distance thus defined is an affine invariant. Pattern f is in the same class as the template $f_0$ if $d(f, f_0) = 0$.

In the HC-representation of image patterns, the Euclidean length of the difference vector $\vec{\delta} = \vec{\gamma}_2 - \vec{\gamma}_1$ of two HC-coordinate vectors $\vec{\gamma}_2 = (\gamma_2^1, \gamma_2^2, \ldots, \gamma_2^n)$, where $\gamma_2^i = <g_i, f>$ and $\vec{\gamma}_1 = (\gamma_1^1, \gamma_1^2, \ldots, \gamma_1^n)$, where $\gamma_1^i = <g_i, f_0>$, provides another metric for the distances between image patterns:

$$|f - f_0|_H = \sqrt{\sum_{i=1}^{n} (\gamma_2^i - \gamma_1^i)^2}.$$

With HC-metric, a pattern distance between f and $f_0$, $d_H(f, f_0)$, can be defined as the distance from vector $f_0$ to orbit Traj(f, A(R,2)):

$$d_H(f, f_0) = \min_{\rho \in R^6} |A(\rho) \circ f - f_0|_H$$

The distance thus defined is an affine invariant. If pattern f is in the same class as the template $f_0$, then $d_H(f, f_0) = 0$.

Let the energy function $E(f, f_0, \rho)$ be defined as $$E(f, f_0, \rho) = |A(\rho) \circ f - f_0|_H^2$$

the computation of affine invariant pattern distance in HC-representation will be the same process of minimizing the energy function. When the two images are binocular pair, they are in same orbit. The minimum energy will be zero and the value ρ which minimizes the energy function will be the binocular affine disparity. In this case, the same process also solves for the system of equations:

$$<g_i, A(\rho) \circ f> - <g_i, f_0> = 0, \; i=1, \ldots, n.$$

What is claimed is:

1. An artificial neural system for determining stereoscopic image affine disparity, and affine invariant distances of first and second images obtained from coupled imaging sensory device comprising:
   a) adjustable HC-linear functional means for receiving intensity signals of said first and second images and providing first-view HC-representation signals and second-view HC-representation signals, and Lie derivative signals of at least one of said first- and second-views;
   b) state vector increment means coupled to adjustable HC-linear functional means for receiving HC-representation signals and Lie derivative signals and providing state vector increment signals;
   c) HC-pattern distance means coupled to adjustable HC-linear functional means for receiving HC-representation signals of first- and second-views and providing HC-pattern distance signal of said two images;
   d) feedback circuit coupled to said state vector increment means for receiving state vector increment signals and providing adjusting signal.

2. The system of claim 1, wherein said adjustable HC-linear functional means comprises a plurality of specific orientation (SO) units, each of said SO-units comprising adjustable HC-reference frame means and Lie differentiation means.

3. The system of claim 2, wherein said adjustable HC-reference frame means comprises first-view simple cell receptive field means and second-view simple cell receptive field means for receiving intensity signals of first image and second image and providing first-view and second-view simple cell response signals, respectively.

4. The system of claim 3, wherein said SO-unit further comprises signal subtraction means coupled to said first-view simple cell receptive field means and second-view simple cell receptive field means for receiving first-view and second-view simple cell response signals and providing simple cell difference signal.

5. The system of claim 4, wherein said feedback circuit comprises global adjusting means for globally adjusting said HC-reference frame and global adjusting control means coupled to said state vector increment means for receiving state vector increment signal and providing global adjusting signal to said global adjusting means in accordance with said state vector increment signal.

6. The system of claim 5, wherein said global adjusting means comprises a plurality of intrinsic influencing means, each corresponding to an SO-unit, coupled to global adjusting control means for receiving global adjusting signal and providing intrinsic influential field signals.

7. The system of claim 6, wherein at least one view of said simple cell receptive field means in said adjustable HC-reference frame means further comprises receptive field adjusting means coupled to said intrinsic influencing means for receiving intrinsic influential field signal and adjusting simple cell receptive field.

8. The system of claim 6, wherein said Lie differentiation means comprises a plurality of Lie germ means for receiving intensity signals of images and providing Lie derivative signals.

9. The system of claim 8, wherein said Lie germ means in said Lie differentiation means further comprises Lie germ adjusting means coupled to said intrinsic influence means for receiving influential field signal and adjusting Lie germ.

10. The system of claim 8, wherein said state vector increment means comprises a plurality of component increment means coupled to adjustable HC-linear functional means for receiving simple cell difference signal and Lie derivative signal, and producing component increment signal.

11. In an artificial neural system including an adjustable HC-linear functional means for receiving intensity signals of said first and second images from a coupled image sensory device and providing first-view HC-representation signals and second-view HC-representation signals and Lie derivative signals of at least one of said first- and second-views, state vector increment means coupled to adjustable HC-linear functional means for receiving HC-representation signals and Lie derivative signals and providing state vector increment signals, HC-pattern distance means coupled to adjustable HC-linear functional means for receiving HC-representation signals of first- and second-views and providing HC-pattern distance signal of said two images, feedback circuit coupled to said state vector increment means for receiving state vector increment signals and providing adjusting signal, the method for determining the stereoscopic image affine disparity, described by l parameters of the two dimensional affine Lie group and affine invariant pattern distance of first and second images of visual stimuli comprising the steps of:

generating a dynamical system with an energy function $E(\rho) = |\vec{\delta}(\rho)|^2$, wherein ρ, the state vector, is extracted by state vector increment means and determines the amount of adjustable HC-reference adjustment, and the non-linear function $|\vec{\delta}(\rho)|$, a signal extracted by HC-pattern distance means, is substantially equivalent to zero when said adjustable HC-reference frame has been adjusted by amount ρ that is substantially equivalent to said affine disparity in binocular vision; and determining at least one minimum point of said non-linear function $|\vec{\delta}(\rho)|$ which gives affine disparity and affine invariant pattern distance.

12. The method of claim 11, wherein said dynamical system comprises the step of setting up initial state of said dynamical system.

13. The method of claim 11, wherein said dynamical system further comprising the step of extracting first and second HC-reference frame representation $\vec{\gamma}_1(\rho) = (\gamma_1^1(\rho), \ldots, \gamma_1^n(\rho))$ and $\vec{\gamma}_2 = (\gamma_2^1, \ldots, \gamma_2^n)$ from said first image L and second image R, respectively, by using n pairs of simple cells means in said HC-reference frame means to obtain each simple cell response signals.

14. The method of claim 13, wherein said dynamical system further comprising the step of extracting difference vector $$\vec{\delta}(\rho) = \vec{\gamma}_2 - \vec{\gamma}_1(\rho)$$

of said two adjustable HC-reference frame coordinate vectors by using signal subtraction means to obtain each simple cell difference signal.

15. The method of claim 14, further comprising the steps of adjusting said HC-reference frame providing said coordinate vectors in accordance with the state vector ρ of said dynamical system, and making corresponding adjustment to said difference vector resulting therefrom.

16. The method of claim 11, wherein said dynamical system comprises the step of extracting Lie derivatives of difference vector $\vec{\delta}(\rho)$, $\vec{\Omega}_{\rho j}=(\Omega_{\rho j}^1, \Omega_{\rho j}^2, \ldots, \Omega_{\rho j}^n)$, $j=1, \ldots, l$.

17. The method of claim 16, wherein said dynamical system further comprises steps of using state vector increment means to obtain state vector increment $\Delta\rho$.

18. The method of claim 16, wherein said dynamical system comprises step of adjusting the state vector by an amount of state vector increment $\rho(t)$:

$$\rho(t+\Delta t)=\rho(t)+\Delta\rho(t),$$

where t is time, and $\Delta t$ is time interval for state vector increments.

19. The method of claim 18, further comprising the steps of adjusting said Lie germ providing adjusted Lie derivatives $\vec{\Omega}_{\rho j}(\rho)=(\Omega_{\rho j}^1(\rho), \Omega_{\rho j}^2(\rho), \ldots, \Omega_{\rho j}^n(\rho))$, $j=1, \ldots, l$, in accordance with the state vector $\rho$ of said dynamical system.

20. The method of claim 11, wherein said determining step comprises the step of terminating said dynamical system.

* * * * *